(12) United States Patent
Pang et al.

(10) Patent No.: US 10,313,682 B2
(45) Date of Patent: Jun. 4, 2019

(54) DETERMINING REGIONS WHEN PERFORMING INTRA BLOCK COPYING

(71) Applicant: QUALCOMM Incorporated, San Diego, CA (US)

(72) Inventors: Chao Pang, San Diego, CA (US); Liwei Guo, San Diego, CA (US); Jianle Chen, San Diego, CA (US); Rajan Laxman Joshi, San Diego, CA (US); Joel Sole Rojals, La Jolla, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 495 days.

(21) Appl. No.: 14/466,407

(22) Filed: Aug. 22, 2014

(65) Prior Publication Data
US 2015/0055703 A1 Feb. 26, 2015

Related U.S. Application Data

(60) Provisional application No. 61/870,192, filed on Aug. 26, 2013, provisional application No. 61/877,074, (Continued)

(51) Int. Cl.
*H04N 19/593* (2014.01)
*H04N 19/82* (2014.01)
(Continued)

(52) U.S. Cl.
CPC ......... *H04N 19/176* (2014.11); *H04N 19/593* (2014.11); *H04N 19/70* (2014.11); *H04N 19/82* (2014.11)

(58) Field of Classification Search
None
See application file for complete search history.

(56) References Cited

U.S. PATENT DOCUMENTS

| 6,157,676 A | 12/2000 | Takaoka et al. |
| 2003/0202588 A1 | 10/2003 | Yu et al. |

(Continued)

FOREIGN PATENT DOCUMENTS

| CN | 103139564 A | 6/2013 |
| EP | 2491718 A1 | 8/2012 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — Frederick D Bailey
(74) *Attorney, Agent, or Firm* — Shumaker & Sieffert, P.A.

(57) ABSTRACT

In general, techniques are described for performing an intra block copying process to code video data. A video decoding device that includes a memory and one or more processors may perform the techniques. The memory may be configured to store a current block of a picture. The processors may be configured to perform an intra block copying process to decode the current block using a prediction block that is from a same slice or a same tile as that in which the coded current block resides, the prediction block restricted to be within a search region that only includes the same slice or the same tile as that in which the coded current block resides.

24 Claims, 6 Drawing Sheets

Related U.S. Application Data filed on Sep. 12, 2013, provisional application No. 61/926,177, filed on Jan. 10, 2014.

(51) Int. Cl.
  *H04N 19/176* (2014.01)
  *H04N 19/70* (2014.01)

(56) References Cited

U.S. PATENT DOCUMENTS

| | | | | |
|---|---|---|---|---|
| 2005/0185713 | A1* | 8/2005 | Winger | H04N 19/51 375/240.12 |
| 2009/0180538 | A1* | 7/2009 | Visharam | H04N 19/176 375/240.15 |
| 2012/0163452 | A1* | 6/2012 | Horowitz | H04N 19/137 375/240.12 |
| 2013/0107941 | A1* | 5/2013 | Kazui | H04N 19/176 375/240.03 |
| 2013/0128978 | A1* | 5/2013 | Yie | H04N 19/176 375/240.16 |
| 2013/0272623 | A1* | 10/2013 | Jeon | H04N 19/159 382/238 |
| 2013/0343460 | A1* | 12/2013 | Itani | H04N 19/00563 375/240.16 |
| 2014/0233646 | A1 | 8/2014 | Matsuo et al. | |
| 2014/0301465 | A1* | 10/2014 | Kwon | H04N 19/503 375/240.16 |
| 2014/0334542 | A1* | 11/2014 | Lee | H04N 19/593 375/240.12 |
| 2014/0376634 | A1 | 12/2014 | Guo et al. | |
| 2015/0071357 | A1 | 3/2015 | Pang et al. | |
| 2015/0146779 | A1* | 5/2015 | Bang | H04N 19/597 375/240.12 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Balle, et al., "Extended Texture Pedistion for H.264 Intra Coding", Video Coding Experts Group (VCEG) Meeting; MPEG Meeting; Jan. 15-16, 2007; Marrakech, MA; (Video Coding Experts Group of ITU-T SG.16), No. VCEG-AE11, XP030003514, 7 pp.

Budagavi et al., "AHG8: Video coding using Intra motion compensation", JCT-VC Meeting; MPEG Meeting; Apr. 18-26, 2013; Incheon, Korea; (Joint Collaborative Team on Video Coding of ISO/IEC JTC1/SC29/WG11 and ITU-T SG.16); URL: http://wftp3.itu.int/av-arch/jctvc-site/, No. JCTVC-M0350, Apr. 12, 2013; XP030114307, 3 pp.

Iwata, et al., "Intra texture prediction based on repetitive pixel replenishment", 19th IEEE International Conference on Image Processing (ICIP), Sep. 30, 2012, XP032333810, pp. 2933-2936.

Dong, et al., "Adaptive Intra Prediction Padding to Improve Intra Motion Compensation", Picture Coding Symposium; Apr. 24-26, 2006; Beijing, China, XP030080231, 4 pp.

Pang C., et al., "AhG5: Fast encoder search and search region restriction for intra block copying", 15. JCT-VC Meeting; Oct. 23, 2013-Nov. 1, 2013; Geneva, CH; (Joint Collaborative Team on Video Coding of ISO/IEC JTC1/SC29/WG11 and ITU-T SG.16 ); URL: http://wftp3.itu.int/av-arch/jctvc-site/, No. JCTVC-O0156-v3,Oct. 24, 2013, XP030115177, 5 pp.

Pang C., et al., "AhG5: Intra block copying with padding", 15. JCT-VC Meeting; Oct. 23, 2013-Nov. 1, 2013; Geneva, Switzerland; (Joint Collaborative Team on Video Coding of ISO/IEC JTC1/SC29/WG11 and ITU-T SG.16 ); URL: http://wftp3.itu.int/av-arch/jctvc-site/, No. JCTVC-O0157-vS, Oct. 26, 2013, XP030115179, 6 pp.

Pang C., et al., "Non-RCE3: Intra Motion Compensation with 2-D MVs", 14. JCT-VC Meeting; Jul. 25, 2013-Aug. 2, 2013; Vienna, AT; (Joint Collaborative Team on Video Coding of ISO/IEC JTC1/SC29/WG11 and ITU-T SG. 16) ; URL : http://wftp3.itu.int/av-arch/jctvc-site/, No. JCTVC-N0256-v4, Aug. 2, 2013 , XP030114777, 12 pp.

Wang et al., "High Efficiency Video Coding (HEVC) Defect Report 2", 15th Meeting, Oct. 23 through Nov. 1, 2013, Geneva, CH; (Joint Collaborative Team on Video Coding of ITU-T SG 16 WP 3 and ISO/IEC JTC1/SC29/WG11) URL: http:// wftp3.1tu.int/ av-arch/ jctvc-site/, No. JCTVC-O1003-v2, Nov. 24, 2013 311 pp.

Joshi et al., "High Efficiency Video Coding (HEVC) Screen Content Coding: Draft 3", 20th Meeting, Feb. 10-17, 2015, Geneva, CH (Joint Collaborative Team on Video Coding of ITU-T SG 16 WP 3 and ISO/IEC JTC1/SC29/WG11) URL: http:// wftp3.1tu.int/ av-arch/ jctvc-site/, No. JCTVC-T1005-v2, Apr. 5, 2015, 565 pp.

"Joint Call for Proposals for Coding of Screen Content," (Visual Coding group of ITU-T Q6/16 and ISO/IEC/JTC1/SC29/WG11) presented in the Jan. 17, 2014 meeting, San Jose, California. URL: http://www.itu.int/en/ITU-T/studygroups/com16/video/Documents/CfP-HEVC-coding-screen-content.pdf, 15 pp.

Yu et al., "New Intro Prediction using Intra-Macroblock Motion Compensation", 3rd Meeting, May 6-10, 2002,Fairfax, Virginia,

(56) References Cited

OTHER PUBLICATIONS

USA (Joint Video Team (JVT) of ISO/IEC MPEG & ITU-T VCEG (ISO/IEC JTC1/SC29/WG11 and ITU-T SG16 Q.6)), No. JVT-C151.r1, 10 pp.
International Search Report and Written Opinion from International Application No. PCT/US2014/052521, dated Oct. 22, 2014, 13 pp.
Response to Written Opinion dated Oct. 22, 2014, from International Application No. PCT/US2014/052521, filed Jun. 22, 2015, 5 pp.
Second Written Opinion from International Application No. PCT/US2014/052521, dated Jul. 23, 2015, 7 pp.
Response to Second Written Opinion dated Jul. 23, 2015, from International Application No. PCT/US2014/052521, filed Sep. 23, 2015, 19 pp.
International Preliminary Report on Patentability from International Application No. PCT/US2014/052521, dated Dec. 14, 2015, 8 pp.
Pang, et al., "Non-RCE3: Intra Motion Compensation with 2-D MVs", JCT-VC Meeting; Jul. 25-Aug. 2013; Vienna; (Joint Collaborative Team on Video Coding of ISO/IEC JTC1/SC29/WG11 and ITU-TSG . 16 ) ; URL : http:/wftp3.itu.int/av-arch/jctvc-site/, No. JCTVC-N0256-v1, Jul. 16, 2013; 12 pp.
Pang, et al., "Non-RCE3: Intra Motion Compensation with 2-D MVs", JCT-VC Meeting; Jul. 25-Aug. 2013; Vienna; (Joint Collaborative Team on Video Coding of ISO/IEC JTC1/SC29/WG11 and ITU-TSG . 16 ) ; URL : http://wftp3.itu.int/av-arch/jctvc-site/, No. JCTVC-N0256-v2, Jul. 23, 2013; 12 pp.
Pang, et al., "Non-RCE3: Intra Motion Compensation with 2-D MVs", JCT-VC Meeting; Jul. 25-Aug. 2013; Vienna; (Joint Collaborative Team on Video Coding of ISO/IEC JTC1/SC29/WG11 and ITU-TSG . 16 ) ; URL : http://wftp3.itu.int/av-arch/jctvc-site/, No. JCTVC-N0256-v3, Jul. 27, 2013; 12 pp.

* cited by examiner

DETERMINING REGIONS WHEN PERFORMING INTRA BLOCK COPYING

This application claims the benefit of U.S. Provisional Application No. 61/870,192, filed Aug. 26, 2013, U.S. Provisional Application No. 61/877,074, filed Sep. 12, 2013, and U.S. Provisional Application No. 61/926,177 filed Jan. 10, 2014, each of which is incorporated by reference herein in its entirety.

TECHNICAL FIELD

This disclosure relates to video coding, and more particularly to techniques for predicting video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video picture or slice may be partitioned into blocks. Each block can be further partitioned. Blocks in an intra-coded (I) picture or slice are encoded using spatial prediction with respect to reference samples in neighboring blocks in the same picture or slice. Blocks in an inter-coded (P or B) picture or slice may use spatial prediction with respect to reference samples in neighboring blocks in the same picture or slice or temporal prediction with respect to reference samples in other reference pictures. Spatial or temporal prediction results in a predictive block for a block to be coded. Residual data represents pixel differences between the original block to be coded and the predictive block.

An inter-coded block is encoded according to an offset vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

Techniques of this disclosure generally relate to searching techniques in a video coding process and, more specifically, to searching techniques used for an intra-block copying operation of the video coding process.

In one aspect, a method of decoding video data comprises performing an intra block copying process to decode a current block of a picture using a prediction block that is from a same slice or a same tile as that in which the coded current block resides, the prediction block restricted to be within a search region that only includes the same slice or the same tile as that in which the coded current block resides.

In another aspect, a method of encoding video data comprises performing an intra block copying process to code a current block of a picture such that pixels from a different slice or a different tile than that in which the current block resides are not included in a search region used in the intra block copying process.

In another aspect, a video decoding device comprises a memory configured to store a current block of a picture, and one or more processors configured to perform an intra block copying process to decode the current block using a prediction block that is from a same slice or a same tile as that in which the coded current block resides, the prediction block restricted to be within a search region that only includes the same slice or the same tile as that in which the coded current block resides.

In another aspect, a video encoding device comprises a memory configured to store a current block of a picture, and one or more processors configured to perform an intra block copying process to encode the current block such that pixels from a different slice or a different tile than that in which the current block resides are not included in a region used when performing the intra block copying process.

In another aspect, a method of encoding video data comprises performing an intra block copying process with respect to a current block of a picture such that pixels from a different slice or different tile than that in which the current block resides are not used when performing the intra block copying process, and encoding the current block after performing the intra block copying process.

In another aspect, a device comprises one or more processors configured to perform an intra block copying process with respect to a current block of a picture such that pixels from a different slice or different tile than that in which the current block resides are not used when performing the intra block copying process, and encode the current block after performing the intra block copying process.

In another aspect, a device comprises means for performing an intra block copying process with respect to a current block of a picture such that pixels from a different slice or different tile than that in which the current block resides are not used when performing the intra block copying process, and means for encoding the current block after performing the intra block copying process.

In another aspect, a method comprises determining a region of a picture when performing an intra block copying process for a current block of the picture, restricting a size of a offset vector identifying a location of a prediction block relative to the current block such that the offset vector only identifies those blocks of the region that reside within the picture, identifying the prediction block within the determined region based on the restricted size of the offset vector, and coding the current block based on the identified prediction block.

In another aspect, a device comprises one or more processors configured to determine a region of a picture when performing an intra block copying process for a current block of the picture, restrict a size of an offset vector identifying a location of a prediction block relative to the current block such that the offset vector only identifies those blocks of the region that reside within the picture, identify the prediction block within the determined region based on the restricted size of the offset vector, and code the current block based on the identified prediction block.

In another aspect, a device comprises means for determining a region of a picture when performing an intra block copying process for a current block of the picture, means for restricting a size of an offset vector identifying a location of a prediction block relative to the current block such that the offset vector only identifies those blocks of the region that reside within the picture, means for identifying the prediction block within the determined region based on the restricted size of the offset vector, and means for coding the current block based on the identified prediction block.

In another aspect, a non-transitory computer-readable storage medium has stored thereon instruction that, when executed, cause one or more processors to determine a region of a picture when performing an intra block copying process for a current block of the picture, restrict a size of an offset vector identifying a location of a prediction block relative to the current block such that the offset vector only identifies those blocks of the region that reside within the picture, identify the prediction block within the determined region based on the restricted size of the offset vector, and code the current block based on the identified prediction block.

In another aspect, a method comprises determining a region of a picture when performing an intra block copying process for a current block of the picture such that the region does not include any block of the picture assigned to a different slice or a different tile than a slice or a tile in which the current block resides and does not require pixel padding to be performed with respect to the picture, identifying a prediction block within the determined region, and coding the current block based on the identified prediction block.

In another aspect, a device comprises one or more processors configured to determine a region of a picture when performing an intra block copying process for a current block of the picture such that the region does not include any block of the picture assigned to a different slice or a different tile than a slice or a tile in which the current block resides and does not require pixel padding to be performed with respect to the picture, identify a prediction block within the determined region, and code the current block based on the identified prediction block.

In another aspect, a device comprises means for determining a region of a picture when performing an intra block copying process for a current block of the picture such that the region does not include any block of the picture assigned to a different slice or a different tile than a slice or a tile in which the current block resides and does not require pixel padding to be performed with respect to the picture, means for identifying a prediction block within the determined region, and means for coding the current block based on the identified prediction block.

In another aspect, a non-transitory computer-readable storage medium having stored thereon instruction that, when executed, cause one or more processors to determine a region of a picture when performing an intra block copying process for a current block of the picture such that the region does not include any block of the picture assigned to a different slice or a different tile than a slice or a tile in which the current block resides and does not require pixel padding to be performed with respect to the picture, identify a prediction block within the determined region, and code the current block based on the identified prediction block.

In another aspect, a method comprises determining a region of a picture when performing an intra block copying process for a current block of the picture such that the region does not include any block of the picture assigned to a different slice or a different tile than a slice or a tile in which the current block resides and that does not extend beyond the picture, identify a prediction block within the determined region, and coding the current block based on the identified prediction block.

In another aspect, a device comprises one or more processors configured to determine a region of a picture when performing an intra block copying process for a current block of the picture such that the region does not include any block of the picture assigned to a different slice or a different tile than a slice or a tile in which the current block resides and that does not extend beyond the picture, identify a prediction block within the determined region, and code the current block based on the identified prediction block.

In another aspect, a device comprises means for determining a region of a picture when performing an intra block copying process for a current block of the picture such that the region does not include any block of the picture assigned to a different slice or a different tile than a slice or a tile in which the current block resides and that does not extend beyond the picture, means for identifying a prediction block within the determined region, and means for coding the current block based on the identified prediction block.

In another aspect, a non-transitory computer-readable storage medium has stored thereon instruction that, when executed, cause one or more processors to determine a region of a picture when performing an intra block copying process for a current block of the picture such that the region does not include any block of the picture assigned to a different slice or a different tile than a slice or a tile in which the current block resides and that does not extend beyond the picture, identify a prediction block within the determined region, and code the current block based on the identified prediction block.

In another aspect, a method comprises determining one or more syntax elements describing application of an intra block copying process to a current block of a picture to generate an encoded version of the current block of the picture, and decoding the encoded version of the current block of the picture based on the one or more syntax elements.

In another aspect, a device comprises one or more processors configured to determine one or more syntax elements describing application of an intra block copying process to a current block of a picture to generate an encoded version of the current block of the picture, and decode the encoded version of the current block of the picture based on the one or more syntax elements.

In another aspect, a device comprises means for determining one or more syntax elements describing application of an intra block copying process to a current block of a picture to generate an encoded version of the current block of the picture, and means for decoding the encoded version of the current block of the picture based on the one or more syntax elements.

In another aspect, a non-transitory computer-readable storage medium has stored thereon instructions that, when executed, cause one or more processors to determine one or more syntax elements describing application of an intra block copying process to a current block of a picture to generate an encoded version of the current block of the picture, and decode the encoded version of the current block of the picture based on the one or more syntax elements.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
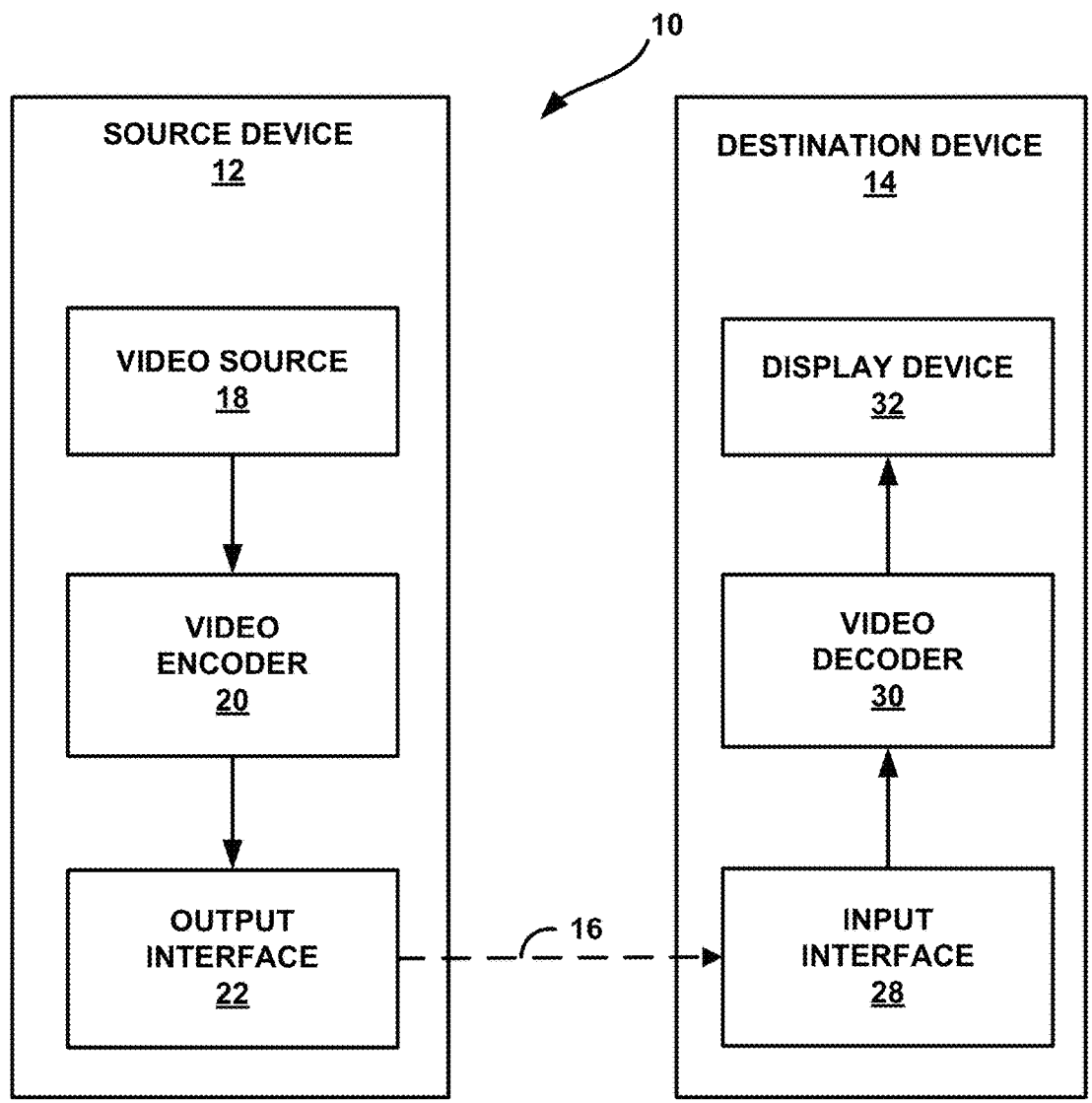
FIG. 1 is a block diagram illustrating an example video encoding and decoding system that may implement the techniques of this disclosure.

Aspects of this disclosure generally relate to video coding and compression. In some examples, the techniques may be related to a High Efficiency Video Coding (HEVC) Range Extension, in which color spaces other than YCbCr 4:2:0 may be supported. The techniques may also relate to an HEVC screen contents coding extension to HEVC. More information for the screen contents coding extension of HEVC can be found in the document of the Visual Coding group of ITU-T Q6/16 and ISO/IEC/JTC1/SC29/WG11, entitled "Joint Call for Proposals for Coding of Screen Content," presented in the 17 Jan. 2014 meeting at San Jose, Calif. and available at: http://www.itu.int/en/ITU-T/study-groups/com16/video/Documents/CfP-HEVC-coding-screen-content.pdf.

HEVC is a video coding standard that was recently developed by the Joint Collaborative Team on Video Coding (JCT-VC) of ITU-T WP3/16 and ISO/IEC JTC 1/SC 29/WG 11. The Range Extension of HEVC includes extending video coding for color spaces other than YCbCr 4:2:0, such as YCbCr 4:2:2, YCbCr 4:4:4, and RGB.

For example, the luma and chroma components of pixels in a coding unit (CU) or transform unit (TU) may be coded in different sub-sampling formats. In an example, the luma and chroma components of a pixel may be coded in a 4:2:0 format. In a 4:2:0 pixel format, for every 2×2 block of pixels, there are four luma components and 2 chroma components (e.g., 1 Cr chroma component and 1 Cb chroma component). As such, in a 2×2 block of pixels, the chroma components are sampled at ½ horizontal resolution and ½ vertical resolution. In a 4:2:2 pixel format, for every 2×2 block of pixels, there are four luma components and 4 chroma components (e.g., 2 Cr chroma components and 2 Cb chroma components). As such, for a 4:2:2 format, the chroma components are sampled at one-half (½) horizontal resolution and full vertical resolution. The 4:4:4 pixel format involves no sub-sampling of chroma components. That is, for a 2×2 block of pixels, there are four luma components, four Cr components, and four Cb components. In an RGB format, the number of red samples, the number of green samples and the number of blue samples are typically equal.

For many applications, such as remote desktop, remote gaming, wireless displays, automotive infotainment, and cloud computing to provide a few examples, the video contents in these applications are usually combinations of natural content, text, artificial graphics and the like. In test and artificial graphics regions, repeated patterns (such as characters, icons, and symbols to provide a few examples) often exist. Intra block copying (BC) may be characterized as a dedicated process that can enable removal of this kind of redundancy, thereby potentially improving the intra-frame coding efficiency as reported in JCT-VC N0256. Intra BC was adopted in the HEVC Range Extension (and has since been proposed to be moved to the Screen Contents Coding extension of HEVC noted above). The techniques described in this disclosure may provide for search region restriction in intra BC, as discussed in further detail below. The search region restriction techniques described in this disclosure may promote more robust video coding in that the search is restricted to the current slice/tile in which the current block resides rather than a different slice/tile, which may be lost or corrupted during transmission and thereby unavailable for use in reconstructing the current block.

FIG. 1 is a block diagram illustrating an example video encoding and decoding system 10 that may utilize techniques for filtering video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing intra BC in video coding may be performed by any digital video encoding and/or decoding device. Although generally the techniques of this disclosure are performed by a video encoding device, the techniques may also be performed by a video codec. Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March 2005, which may be referred to herein as the H.264 standard or H.264 specification, or the H.264/AVC standard or specification. Other examples of video compression standards include MPEG-2 and ITU-T H.263.

While the techniques of this disclosure are not limited to any particular coding standard, the techniques may be relevant to the HEVC standard. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block."

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30, upon obtaining the coded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20. Video decoder 30 may reconstruct the original, unencoded video sequence using the data contained in the bitstream.

Figure 6:
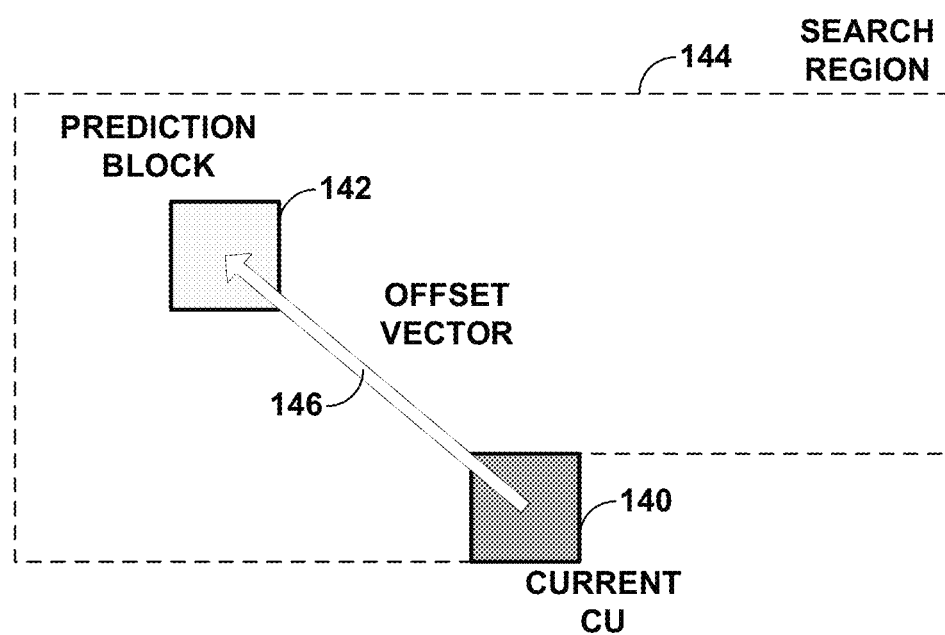
FIG. 6 is a diagram illustrating an example of the intra block copying process.

Many applications, such as remote desktop, remote gaming, wireless displays, automotive infotainment, cloud computing, or the like, are becoming routine in daily personal lives. Video content in these applications are typically combinations of natural content, text, artificial graphics, and the like. In text and artificial graphics, region of the content may include repeated patterns (such as characters, icons, and symbols to provide a few examples) often exist. Intra block copying (BC) is a dedicated technique that enables removal of this kind of redundancy, thereby potentially improving the intra-frame coding efficiency as reported in JCT-VC N0256. At a recent JCT-VC meeting, intra BC was adopted in the HEVC Range Extension standard (which has since been moved to the Screen Contents Coding extension of HEVC, as noted above). As illustrated in more detail in the example of FIG. 6, for a current coding unit (CU) 140 under intra BC, video encoder 20 may obtain a prediction signal 142 (which may also be referred to as a "prediction block") from an already reconstructed region 144 in the same frame. In some instances, video encoder 20 may encode the offset or displacement vector 146 (which may also be referred to by the misnomer "motion vector"), which indicates the position of the prediction signal 142 displaced from the current CU 140, together with the residue signal.

Guo et al., "INTRA-PREDICTION FROM A PREDICTIVE BLOCK," U.S. application Ser. No. 14/309,730 filed Jun. 19, 2014 (hereinafter, the "'730 patent application," and provided as Appendix 1 in U.S. Provisional Application Ser. No. 61/926,177) described an extension of Intra BC to PUs and TUs, motion vector signaling for Intra BC, interaction of Intra BC with deblocking/SAO, an interpolation filter for Intra BC, signaling of Intra_bc_flag, and similar techniques. Pang et al., "PARTIAL INTRA BLOCK COPYING," U.S. Provisional Application Ser. No. 61/891,291, filed Oct. 15, 2013 (hereinafter, the "'291 provisional application," and provided in U.S. Provisional Application Ser. No. 61/926, 177 as Appendix 2), describes an extension of Intra BC to a situation where only a prediction block is not completely reconstructed.

In JCT-VC N0256, the search region may be restricted to be in the reconstructed area of a coded tree unit (CTU) to the left of the current CTU potentially without in-loop filtering. However, because of the possible interaction with other components, the restriction proposed in JCT-VC N0256 may not be enough for the coding units (CUs) of the current CTU at boundaries of slices/tiles/frames. For example, when multiple slices are allowed for a picture and the prediction block is from a different slice, the current CU (which is another way of referring to a video block) coded with intra BC mode may not be correctly decoded. Also, as another example, when the offset vector points to a position that is out of a current picture (meaning that the search region extends beyond the bounds of the picture) and no padding scheme is pre-defined, then the CU coded with the intra BC mode may not be correctly decoded as well.

In accordance with various aspects of the techniques described in this disclosure, video encoder 20 may determine a search region that can be used for Intra BC such that this region is inside the same slice/tile in which the current CU resides. For example, with this restriction, when the possible search region is set to be the reconstructed area of the left CTU and current CTU as in JCT-VC N0256 (which refers to this region as the "intended region"), the left CTU may be used only when this left CTU is in the same slice/tile as that of the current CTU. In other words, when the left CTU and the current CTU are in different slices/tiles, the video encoder 20 may only determine that the current CTU without in-loop filtering is used for Intra BC. In this respect, video encoder 20 may be configured to perform the intra block copying process to encode a current block of a picture such that pixels from a different slice or a different tile than that in which the current block resides are excluded from a search region used for the intra block copying process.

In some examples, the pixels included in the region (also referred to herein as the "search region") have not been processed using any in-loop filters. Application of in-loop filters to the search region may result in increased residual and/or differences between the prediction block and the current CU to which the intra block copying process is performed. By foregoing or disabling the typical application of in-loop filtering to the pixels (or a block of pixels) of the search region, the techniques may promote more efficient encoding through application of the intra block copying process in that less bits may be required to represent the current CU to which the intra block copying process is performed.

In yet other examples where the current block to which the intra block copying processes is applied is a PU/TU, the techniques may provide a configuration for video encoder 20 that further restricts the application of the intra block copying process. Video encoder 20 may, when the current block is a PU/TU of a current CU, apply the intra block copying process such that not only is the search region restricted to the same slice and tile as that in which the current PU/TU resides but also restricted such that any other PU/TU's of the current CU are not included in the search region. This second restriction with regard to excluding other PU/TU's of the current CU from the search region may promote parallel processing of PU/TU's for the current CU. In other words, video encoder 20 may process multiple PU/TU's of the same CU at the same time, which as a result would the PU/TU's of the same CU as being within a search region for the other PU/TU's of the same CU. Video encoder 20 may promote this same CU restriction so as to facilitate parallel processing at video encoder 30. In this manner, the techniques may promote more efficient and reliable application of the intra-block copying process by video encoder 20.

The techniques may also enable a configuration of video decoder 30 generally reciprocal to that described above with respect to video encoder 20. In this respect, video decoder 30 may be configured to perform an intra block copying process to decode a coded current block of a picture using a prediction block that is from a same slice or a same tile as that in which the coded current block resides. In some examples, the prediction block has, as noted above when discussing video encoder 20, not been processed using any in-loop filtering. Moreover, when the coded current block is one or more of a coded current prediction unit (PU) or a coded current transform unit (TU) of a coded current coding unit (CU), the prediction block may not overlap the coded current CU.

Figure 2:
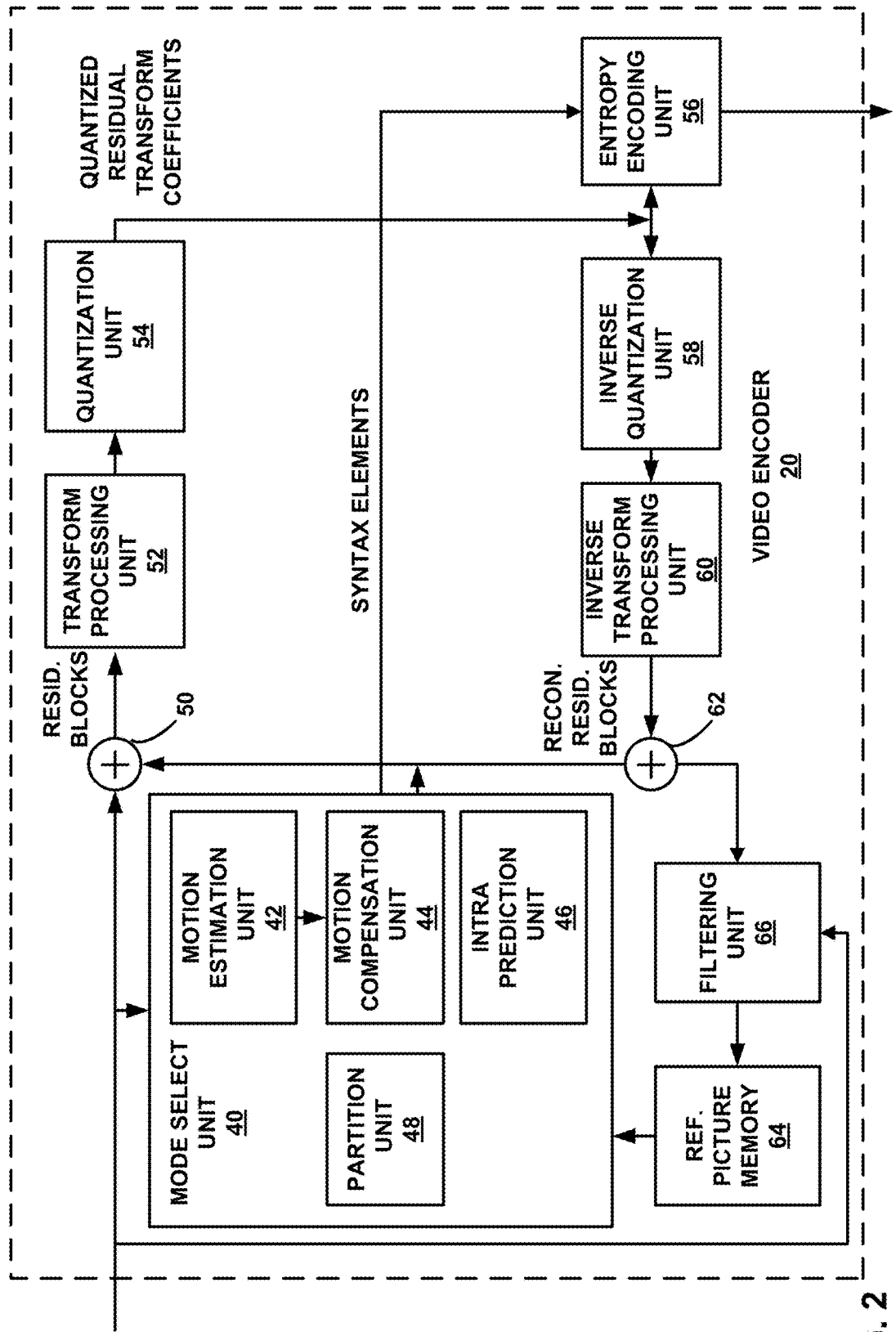
FIG. 2 is a block diagram illustrating an example video encoder that may implement the techniques of this disclosure.

FIG. 2 is a block diagram illustrating an example of a video encoder 20 that may use techniques for transformation as described in this disclosure. The video encoder 20 will be described in the context of HEVC coding for purposes of illustration, but without limitation of this disclosure as to other coding standards.

Video encoder 20 may perform intra- and inter-coding of video blocks within video slices. Intra-coding relies on spatial prediction to reduce or remove spatial redundancy in video within a given video picture. Inter-coding relies on temporal prediction to reduce or remove temporal redundancy in video within adjacent pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform processing unit 60, summer 62, and filtering unit 66.

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56. The techniques of this disclosure may be applied in response to mode select unit 40 implementing an intra-block copy mode.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block.

Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

Filtering unit 66 may perform a variety of filtering processes. For example, filtering unit 66 may perform deblocking That is, filtering unit 66 may receive a plurality of reconstructed video blocks forming a slice or a frame of reconstructed video and filter block boundaries to remove blockiness artifacts from a slice or frame. In one example, filtering unit 66 evaluates the so-called "boundary strength" of a video block. Based on the boundary strength of a video block, edge pixels of a video block may be filtered with respect to edge pixels of an adjacent video block such that the transition from one video block are more difficult for a viewer to perceive.

In some instances, the variables used by a deblocking filter may be derived from reconstructed video blocks without a comparison of reconstructed video blocks to the original source video blocks. Thus, video encoder 20 and video decoder 30 (FIG. 3) may each be programmed to perform the same deblocking process on reconstructed video blocks with minimal additional information regarding the original video frame coded into the bitstream. However, in some cases, filtering unit 66 may include syntax elements in the bitstream to indicate whether deblocking should be performed and/or whether one of a particular type of deblocking modes should be performed.

In accordance with various aspects of the techniques described in this disclosure, video encoder 20 and, more specifically, intra prediction unit 46 of video encoder 20 may perform an intra block copying process to encode a current block of a picture such that pixels from a different slice or different tile than that in which the current block resides are not included in a regions used when performing the intra block copying process. More specifically, when performing the intra block copying process, the intra prediction unit 46 may be configured to determine a region of the picture such that the region does not include any block of the picture assigned to a different slice or a different tile than a slice or a tile in which the current block resides, identify a prediction block within the determined region, and encode the current block based on the identified prediction block.

In some examples, the pixels included in the region have not been processed using any in-loop filters for the reasons noted above. In these examples, the techniques may configure video encoder 20 such that filtering unit 66 is disabled and does not apply any in-loop filters to the search region.

In yet other examples where the current block to which the intra block copying processes is applied is a PU/TU, the techniques may provide a configuration for intra prediction unit 46 that further restricts the application of the intra block copying process. Intra prediction unit 46 may, when the current block is a PU/TU of a current CU, apply the intra block copying process such that not only is the search region restricted to the same slice and tile as that in which the current PU/TU resides but also restricted such that any other PU/TU's of the current CU are not included in the search region.

That is, the prediction block in the reconstructed region may, in these and other examples, be restricted such that this prediction block cannot overlap with the current CU. In other words, since the current CU is not in the reconstructed region in some instances, the whole prediction block should be in the reconstructed region. By ensuring this prediction block is the reconstructed region, mismatching between video encoder 20 and decoder 30 may be avoided when Intra BC mode is used. It is also possible that only part of the prediction block is in the reconstructed region, and the remaining part which is not in the reconstructed region is obtained using predefined methods, such as padding, inpainting, etc.

When Intra BC is extended to PU/TU, as in the '730 patent application, for example, a 2N×2N CU can be divided into two 2N×N, two N×2N blocks, or four N×N blocks. Each of the blocks in the above mentioned cases are denoted as PU/TU, to align the terminology as in HEVC version 1. This disclosure proposes that the prediction block for a PU/TU should not overlap with a current CU, although part of the current CU might be available, meaning a prediction block for a PU/TU of the current CU should not contain any pixel that is within the current CU. Alternatively, the prediction block of a PU/TU of the current CU can be located at least partially (and in some cases, completely) within an already decoded and reconstructed PU/TU of the current CU.

Under the restriction described above, it is possible that the whole prediction block for the PU/TU is reconstructed. It is also possible that only part of the prediction block is in the reconstructed region, and the remaining part, which is not in the reconstructed region, is obtained using predefined methods, such as padding (for example, the methods in the '291 provisional application), inpainting, or other such predefined methods.

In this respect, intra block wherein performing the intra prediction unit 46 may be configured to determine the region of the picture such that the region does not include any block of the picture assigned to the different slice or the different tile than the slice or the tile in which the current block resides and identify a prediction block that resides at least partially within the determined region. Intra prediction unit 46 may then encode the current block based on the identified prediction block.

The techniques may also, in some examples, avoid the fetch of pixels outside the current slice/tile by limiting the range of a motion vector to be possibly smaller than the intended region. This can also be achieved by pixel padding (and the range of the motion vector can be relaxed to be the same as the intended region). "Pixel padding" may refer to adding and/or interpolating pixels that are not included in an original picture or slice. To be more specific, when a pixel is outside the current slice/tile, video encoder 20 may replaced the pixel outside the current frame by the value of the closest pixel that is in the available region. Such techniques may improve efficiency by limiting the amount of data that is retrieved from memory during coding.

In this respect, intra prediction unit 46 may be configured to determine a region of a picture when performing an intra block copying process for a current block of the picture and restricting a size of an offset vector identifying a location of a prediction block relative to the current block within the determined region such that the offset vector is unable to identify those blocks of the region that reside outside of the slice or the tile in which the current block resides. Intra prediction unit 46 may further be configured to identify a prediction block within the determined region based on the offset vector, and encoding the current block based on the identified prediction block.

Moreover, in these and other examples, intra prediction unit 46 may be configured to determine a region of a picture when performing an intra block copying process for a current block of the picture and, when the determined region extends beyond the slice or the tile in which the current block resides, padding the slice or the tile to generate a padded slice or a padded tile that is the same size as the determined region. Intra prediction unit 46 may then identify a prediction block within the determined region, and encode the current block based on the identified prediction block.

Alternatively, intra prediction unit 46 may be configured to determine the region of the picture such that the region does not include any block of the picture assigned to the different slice or the different tile than the slice or the tile in which the current block resides and does not require pixel padding to be performed with respect to the picture.

In accordance with various aspects of the techniques described in this disclosure, a flag, intrabc_across_tiles_enabled_flag, may be added at a parameter set level, such as a picture parameter set (PPS) or sequence parameter set (SPS) level. Video encoder 20 may set intrabc_across_tiles_enabled_flag equal to 1 to specify that a reconstructed area without in-loop filters from other tiles can be used for the prediction of the CUs with intra BC mode in current tile. Video encoder 20 may set the intrabc_across_tiles_enabled_flag equal to 0 so as to specify that only a reconstructed area without in-loop filters from the current tile can be used for the prediction of the CUs with Intra BC mode in current tile.

Similarly, another flag, intrabc_cross_slices_enabled_flag, may be added at a PPS/SPS level, where intrabc_cross_slices_enabled_flag equal to 1 specifies that reconstructed area without in-loop filters from other slices can be used for the prediction of the CUs with Intra BC mode in current slice. When intrabc_cross_slices_enabled_flag is equal to 0, the intrabc_cross_slices_enabled_flag specifies that only reconstructed areas without in-loop filters from the current slice can be used for the prediction of the CUs with Intra BC mode in current slice.

The techniques may, in this way, provide a configuration enabling entropy coding unit 56 to specify, in one or more of a picture parameter set or sequence parameter set included within a bitstream to which the coded current block is stored, an intrabc_across_tiles_enabled_flag syntax element indicating whether the region was determined such that the region does not include any block of the picture assigned to the different tile than the tile in which the current block resides.

Moreover, the techniques may provide a configuration enabling entropy coding unit 56 to specify, in one or more of a picture parameter set or sequence parameter set included within a bitstream to which the coded current block is stored, an intrabc_cross_slices_enabled_flag syntax element indicating whether the region was determined such that the region does not include any block of the picture assigned to the different slice than the slice in which the current block resides.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video encoder 20 (such as intra prediction unit 46 or entropy encoding unit 56) it should be understood that one or more other units of video encoder 20 may also be responsible for carrying out such techniques.

Figure 3:
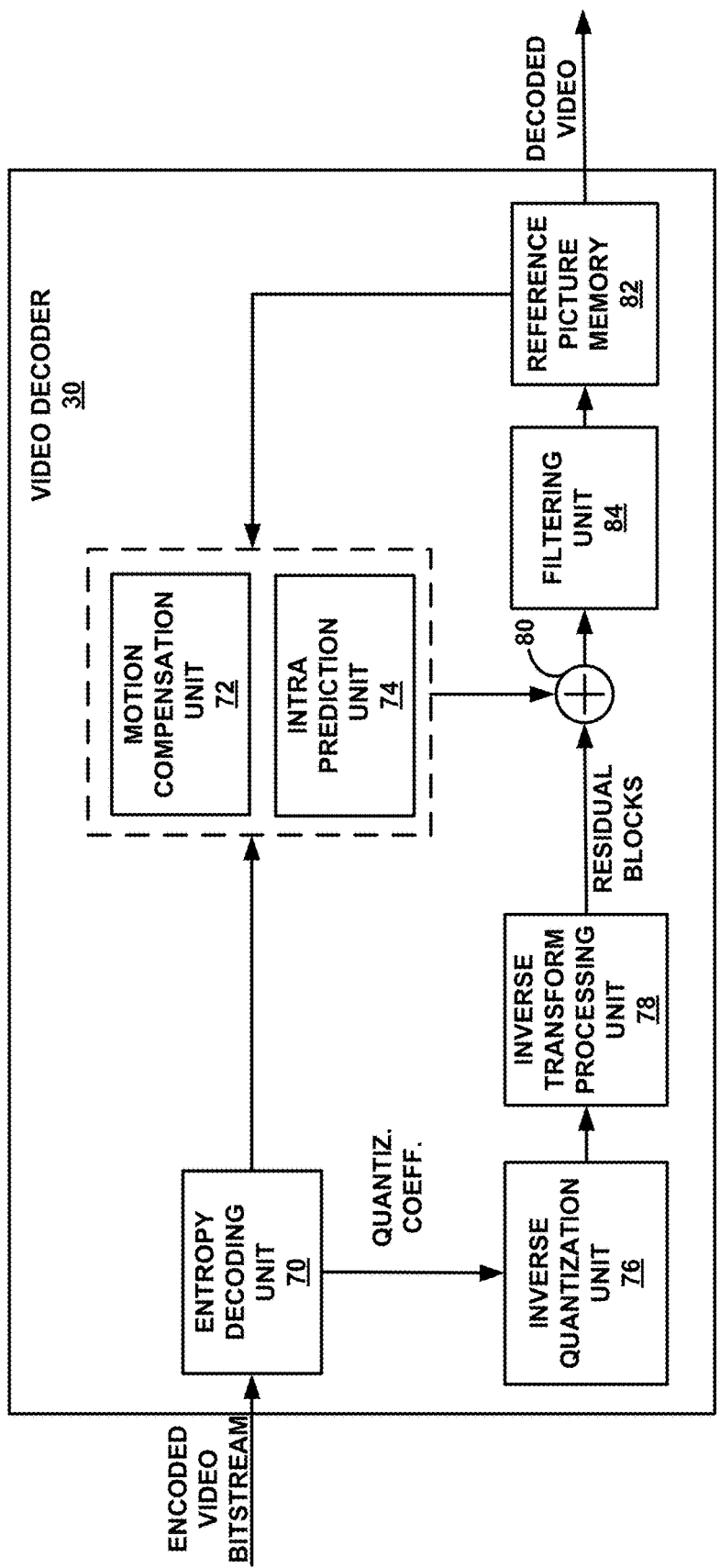
FIG. 3 is a block diagram illustrating an example video decoder that may implement the techniques of this disclosure.

FIG. 3 is a block diagram illustrating an example of video decoder 30 that may implement techniques for transformation as described in this disclosure. Again, the video decoder 30 will be described in the context of HEVC coding for purposes of illustration, but without limitation of this disclosure as to other coding standards.

In the example of FIG. 3, video decoder 30 includes an entropy decoding unit 70, motion compensation unit 72, intra prediction unit 74, inverse quantization unit 76, inverse transformation processing unit 78, reference picture memory 82, summer 80, and filtering unit 84.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current picture. When the video picture is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform processing unit 78 applies an inverse transform, e.g., an inverse DCT, an inverse integer transform, or a conceptually similar inverse transform process, to the transform coefficients in order to produce residual blocks in the pixel domain. Video decoder 30 forms a decoded video block by summing the residual blocks from inverse transform processing unit 78 with the corresponding predictive blocks generated by motion compensation unit 72. Summer 80 represents the component or components that perform this summation operation.

Filtering unit 84 may, in some examples, be configured similarly to filtering unit 66 of video encoder 20 (FIG. 2). For example, filtering unit 84 may be configured to perform deblocking, SAO, or other filtering operations when decoding and reconstructing video data from an encoded bitstream.

In some instances, video decoder 30 may perform one or more of the techniques described with respect to video encoder 20 above. For example, video decoder 30 may perform the techniques of this disclosure for performing intra BC. In some examples, video decoder 30 may obtain one or more syntax elements from an encoded bitstream, and perform the techniques of this disclosure based on such syntax elements.

For example, video decoder 30 may be configured to determine one or more syntax elements describing application of an intra block copying process to a current block of a picture to generate an encoded version of the current block of the picture, and decode the encoded version of the current block of the picture based on the one or more syntax elements.

In some instances, video decoder 30 may further be configured to, when determining the one or more syntax elements, determine an intrabc_across_tiles_enabled_flag indicating whether a region that was determined during application of the intra block copying process includes any block of the picture assigned to a different tile than a tile in which the current block resides.

In some instances, video decoder 30 may further be configured to, when determining the one or more syntax elements, determine, in one or more of a picture parameter set or sequence parameter set, an intrabc_across_tiles_enabled_flag syntax element indicating whether a region that was determined during application of the intra block copying process includes any block of the picture assigned to a different tile than a tile in which the current block resides.

In some instances, video decoder 30 may further be configured to, when determining the one or more syntax elements, determine an intrabc_cross_slices_enabled_flag syntax element indicating whether a region that was determined during application of the intra block copying process includes any block of the picture assigned to a different slice than a slice in which the current block resides.

In some instances, video decoder 30 may further be configured to, when determining the one or more syntax elements, determine, in one or more of a picture parameter set or sequence parameter set, an intrabc_cross_slices_enabled_flag syntax element indicating whether a region that was determined during application of the intra block copying process includes any block of the picture assigned to a different slice than a slice in which the current block resides.

More specifically, the techniques may enable a configuration of intra prediction unit 74 of video decoder 30 that is generally reciprocal to that described above with respect to intra prediction unit 46. In this respect, intra prediction unit 74 may be configured to perform an intra block copying process to decode a coded current block of a picture using a prediction block that is from a same slice or a same tile as that in which the coded current block resides.

In some examples, the prediction block has, as noted above when discussing intra prediction unit 46, not been processed using any in-loop filtering. The techniques may, in this example, disable application of in-loop filters by filtering unit 84 to the identified prediction block (or possibly the pixels in the slice and/or tile as a whole).

Moreover, when the coded current block is one or more of a coded current prediction unit (PU) or a coded current transform unit (TU) of a coded current coding unit (CU), the prediction block may not overlap the coded current CU. Intra prediction unit 74 may be configured to generate an error when the prediction block overlaps the current CU in these instances, which may be handled in a number of different ways (e.g., by replacing the prediction block with a template block or replacing the prediction block with a block closest to the overlapping prediction block but that does not overlap the current CU).

Intra prediction unit 74 may further be configured to obtain an offset vector that identifies the prediction block within the same slice or the same tile as that in which the coded current block resides and obtain the prediction block based on a location of the coded current block and the offset vector. Typically, entropy decoding unit 70 parses the offset vector from the encoded video bitstream and provides this offset vector (after performing entropy decoding in some examples) to the intra prediction unit 74. Intra prediction unit 74 may obtain the prediction block by accessing reference picture memory 82 (or an intermediate memory used to cache the current picture to be decoded). Intra prediction unit 76 may then decode the coded current block based on the prediction block.

Intra prediction unit 74 may, in some examples, be configured to obtain an offset vector that identifies the prediction block within the same slice or the same tile as that in which the coded current block resides, wherein a size of the offset vector has been restricted such that the offset vector is unable to identify a block outside of the same slice or the same tile in which the coded current block resides. Intra prediction unit 74 may then obtain the prediction block based on a location of the coded current block and the offset vector, and decode the coded current block based on the prediction block.

In some examples, the intra prediction unit 74 may obtain an offset vector that identifies the prediction block that resides partially within the same slice or the same tile as that in which the coded current block resides, and pad the slice or the tile to generate a padded slice or a padded tile that fills in a portion of the prediction block that resides outside of the slice or the tile. Intra prediction unit 74 may then obtain the prediction block based on a location of the coded current block and the offset vector, the prediction block including at least some portion of the padding, and decode the coded current block based on the prediction block.

In this respect, the techniques described in this disclosure may enable a video coder to perform a more efficient and reliable form of an intra block copying process that is resilient to loss of a slice and/or tile while also promoting coding efficiency. A video coder, as described in this disclosure, may refer to a video encoder or a video decoder. Similarly, a video coding unit may refer to a video encoder or a video decoder. Likewise, video coding may refer to video encoding or video decoding, as applicable.

Figure 4:
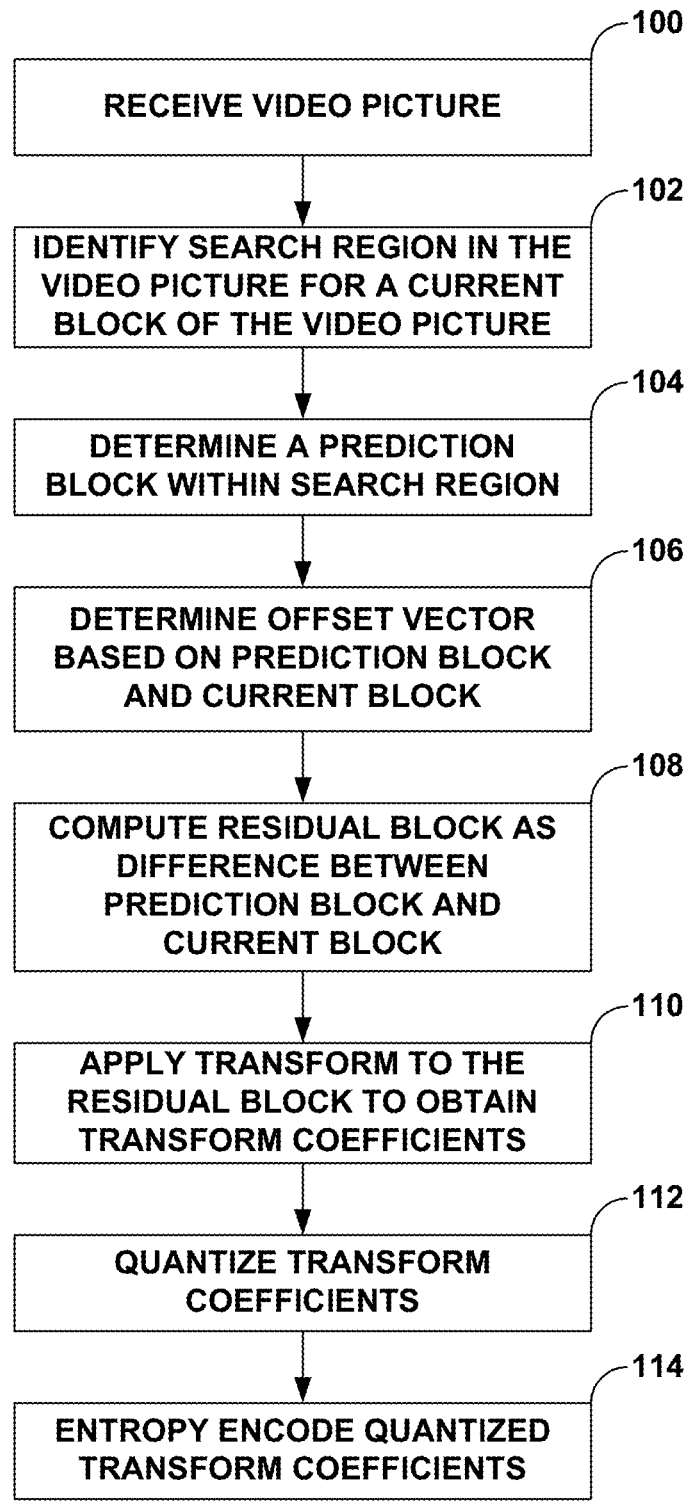
FIG. 4 is a flowchart illustrating exemplary operation of a video encoding device in performing the region restricted intra block coding techniques described in this disclosure.

FIG. 4 is a flowchart illustrating exemplary operation of a video encoding device, such as video encoder 20 shown in the example of FIG. 2, in performing the region restricted intra block coding techniques described in this disclosure. In the example of FIG. 4, video encoder 20 receives a video picture or slice to be coded (100). The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data. In this way, video encoder 20 may identify that application of an intra block copying process to a current block of a picture results in the most efficient way by which to code the current block.

In performing this intra block copying process, intra prediction unit 46 may first identify a search region in the video picture for a current block (e.g., CU) of the video picture such that the search region does not include pixels from a different slice or a different tile to which the current CU resides in accordance with the techniques described in this disclosure (102). Intra prediction unit 46, after identifying the appropriate search region, may next determine a prediction block within the search region from which the current CU is to be predicted (104). Intra prediction unit 46 may perform this determination by accessing each block within the search region and determining the difference between each block and the current CU. Intra prediction unit 46 may determine the prediction block as the block that results in the least amount of residual or, in other words, smallest difference between the block and the current CU.

Intra prediction unit 46 may next determine an offset vector identifying the location of the selected block (which may be referred to as the "prediction block") relative to the current CU. In this way, intra prediction unit 46 may determine the offset vector based on the prediction block and the current block (106). Intra prediction unit 46 may signal the offset vector to entropy encoding unit 56, which entropy encodes the offset vector and adds the encoded offset vector to the bitstream. Intra prediction unit 46 may in this respect compute the residual as the difference between the prediction block and the current block (108) and then pass the residual as a residual block to the transform processing unit 52.

Transform processing unit 52 applies a transform, such as a discrete cosine transform (DCT) or a conceptually similar transform, to the residual block (110), producing a video block comprising residual transform coefficient values. Transform processing unit 52 may send the resulting transform coefficients to quantization unit 54. Quantization unit 54 quantizes the transform coefficients to further reduce bit rate (112). Following quantization, entropy encoding unit 56 entropy codes (which refers to statistical lossless coding, as one example) the quantized transform coefficients (114) and store the entropy encoded quantized transform coefficients to the bitstream. This process iterates until all of the blocks of the video picture are encoded, although not all of the block may be encoded using an intra block copying process.

Figure 5:
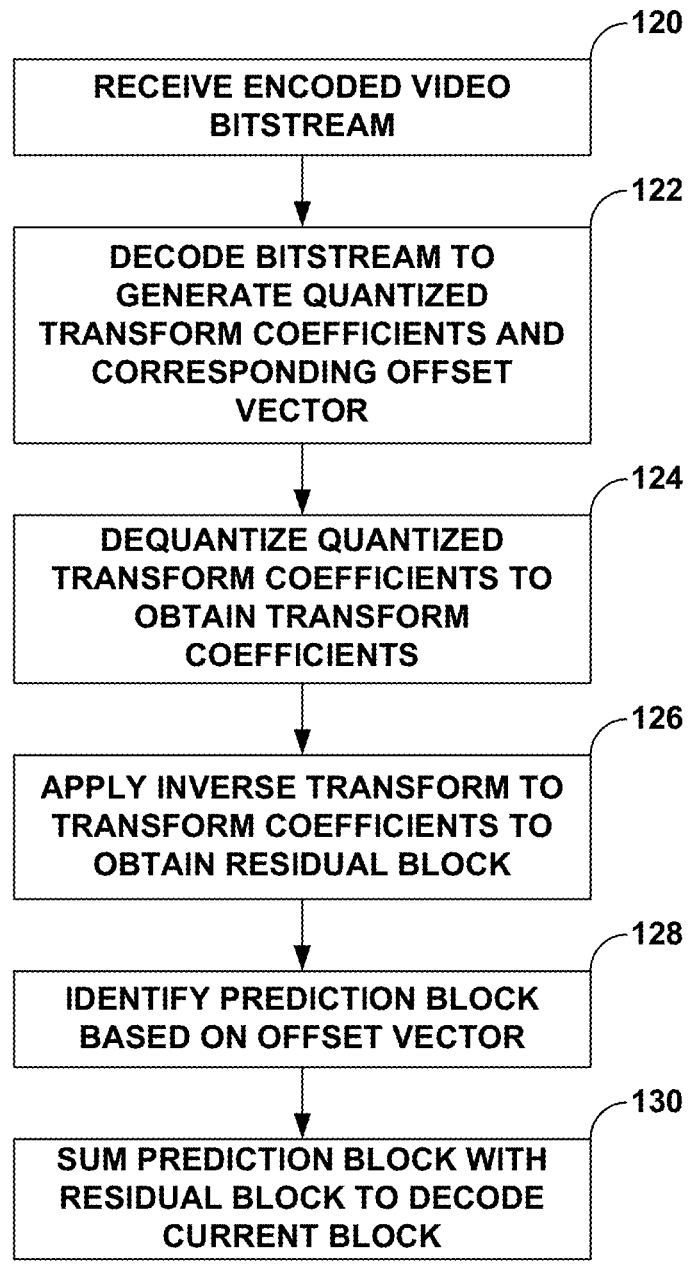
FIG. 5 is a flowchart illustrating exemplary operation of a video decoding device in performing the region-restricted intra block copying processing techniques described in this disclosure.

FIG. 5 is a flowchart illustrating exemplary operation of a video decoding device, such as video decoder 30 shown in the example of FIG. 3, in performing the region restricted intra block copying processing techniques described in this disclosure. Initially, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, and in the case of intra block copying, a corresponding an offset vector (122). Entropy decoding unit 70 forwards the quantized transform coefficients to inverse quantization unit 76 and the corresponding offset vector to intra prediction unit 74.

Inverse quantization unit 76 dequantizes the quantized transform coefficients to obtain transform coefficients (124). Inverse transform processing unit 78 applies an inverse transform to the transform coefficients to obtain the residual block (126). Meanwhile, intra prediction unit 74 identifies a prediction block stored to reference picture memory 82 (or some other intermediate memory) based on the offset vector (128), providing this prediction block to summer 80. Summer 80 sums the residual block with the prediction block to reconstruct or, in other words, decode the coded current block (130).

Certain aspects of this disclosure have been described with respect to the developing HEVC standard for purposes of illustration. However, the techniques described in this disclosure may be useful for other video coding processes, including other standard or proprietary video coding processes not yet developed.

In some examples, the techniques of this disclosure may relate to methods/devices/computer-readable media in accordance with one or more of the following clauses:

Clause 1. A method comprising:
determining a region of a picture when performing an intra block copying process for a current block of the picture;
restricting a size of an offset vector identifying a location of a prediction block relative to the current block such that the offset vector only identifies those blocks of the region that reside within the picture;
identifying the prediction block within the determined region based on the restricted size of the offset vector; and
coding the current block based on the identified prediction block.

Clause 2. A device comprising:
one or more processors configured to determine a region of a picture when performing an intra block copying process for a current block of the picture, restrict a size of an offset vector identifying a location of a prediction block relative to the current block such that the offset vector only identifies those blocks of the region that reside within the picture, identify the prediction block within the determined region based on the restricted size of the offset vector, and code the current block based on the identified prediction block.

Clause 3. A device comprising:
means for determining a region of a picture when performing an intra block copying process for a current block of the picture;
means for restricting a size of a offset vector identifying a location of a prediction block relative to the current block such that the offset vector only identifies those blocks of the region that reside within the picture;
means for identifying the prediction block within the determined region based on the restricted size of the offset vector; and
means for coding the current block based on the identified prediction block.

Clause 4. A non-transitory computer-readable storage medium having stored thereon instruction that, when executed, cause one or more processors to:
determine a region of a picture when performing an intra block copying process for a current block of the picture;
restrict a size of an offset vector identifying a location of a prediction block relative to the current block such that the offset vector only identifies those blocks of the region that reside within the picture;
identify the prediction block within the determined region based on the restricted size of the offset vector; and
code the current block based on the identified prediction block.

Clause 5. A method comprising:
determining a region of a picture when performing an intra block copying process for a current block of the picture such that the region does not include any block of the picture assigned to a different slice or a different tile than a slice or a tile in which the current block resides and does not require pixel padding to be performed with respect to the picture;
identifying a prediction block within the determined region; and
coding the current block based on the identified prediction block.

Clause 6. A device comprising:
one or more processors configured to determine a region of a picture when performing an intra block copying process for a current block of the picture such that the region does not include any block of the picture assigned to a different slice or a different tile than a slice or a tile in which the current block resides and does not require pixel padding to be performed with respect to the picture, identify a prediction block within the determined region, and code the current block based on the identified prediction block.

Clause 7. A device comprising:
means for determining a region of a picture when performing an intra block copying process for a current block of the picture such that the region does not include any block of the picture assigned to a different slice or a different tile than a slice or a tile in which the current block resides and does not require pixel padding to be performed with respect to the picture;

means for identifying a prediction block within the determined region; and means for coding the current block based on the identified prediction block.

Clause 8. A non-transitory computer-readable storage medium having stored thereon instruction that, when executed, cause one or more processors to:

determine a region of a picture when performing an intra block copying process for a current block of the picture such that the region does not include any block of the picture assigned to a different slice or a different tile than a slice or a tile in which the current block resides and does not require pixel padding to be performed with respect to the picture;

identify a prediction block within the determined region; and code the current block based on the identified prediction block.

Clause 9. A method comprising:

determining a region of a picture when performing an intra block copying process for a current block of the picture such that the region does not include any block of the picture assigned to a different slice or a different tile than a slice or a tile in which the current block resides and that does not extend beyond the picture;

identifying a prediction block within the determined region; and coding the current block based on the identified prediction block.

Clause 10. A device comprising:

one or more processors configured to determine a region of a picture when performing an intra block copying process for a current block of the picture such that the region does not include any block of the picture assigned to a different slice or a different tile than a slice or a tile in which the current block resides and that does not extend beyond the picture, identify a prediction block within the determined region, and code the current block based on the identified prediction block.

Clause 11. A device comprising:

means for determining a region of a picture when performing an intra block copying process for a current block of the picture such that the region does not include any block of the picture assigned to a different slice or a different tile than a slice or a tile in which the current block resides and that does not extend beyond the picture;

means for identifying a prediction block within the determined region; and means for coding the current block based on the identified prediction block.

Clause 12. A non-transitory computer-readable storage medium having stored thereon instruction that, when executed, cause one or more processors to:

determine a region of a picture when performing an intra block copying process for a current block of the picture such that the region does not include any block of the picture assigned to a different slice or a different tile than a slice or a tile in which the current block resides and that does not extend beyond the picture;

identify a prediction block within the determined region; and code the current block based on the identified prediction block.

Clause 13. A method comprising:

determining one or more syntax elements describing application of an intra block copying process to a current block of a picture to generate an encoded version of the current block of the picture; and decoding the encoded version of the current block of the picture based on the one or more syntax elements.

Clause 14. The method of clause 13, wherein determining the one or more syntax elements comprises determining an intrabc_across_tiles_enabled_flag indicating whether a region that was determined during application of the intra block copying process includes any block of the picture assigned to a different tile than a tile in which the current block resides.

Clause 15. The method of clause 13, wherein determining the one or more syntax elements comprises determining, in one or more of a picture parameter set or sequence parameter set, an intrabc_across_tiles_enabled_flag syntax element indicating whether a region that was determined during application of the intra block copying process includes any block of the picture assigned to a different tile than a tile in which the current block resides.

Clause 16. The method of clause 13, wherein determining the one or more syntax elements comprises determining an intrabc_cross_slices_enabled_flag syntax element indicating whether a region that was determined during application of the intra block copying process includes any block of the picture assigned to a different slice than a slice in which the current block resides.

Clause 17. The method of clause 13, wherein determining the one or more syntax elements comprises determining, in one or more of a picture parameter set or sequence parameter set, an intrabc_cross_slices_enabled_flag syntax element indicating whether a region that was determined during application of the intra block copying process includes any block of the picture assigned to a different slice than a slice in which the current block resides.

Clause 18. A device comprising:

one or more processors configured to determine one or more syntax elements describing application of an intra block copying process to a current block of a picture to generate an encoded version of the current block of the picture, and decode the encoded version of the current block of the picture based on the one or more syntax elements.

Clause 19. The device of clause 18, wherein the one or more processors are further configured to, when determining the one or more syntax elements, determine an intrabc_across_tiles_enabled_flag indicating whether a region that was determined during application of the intra block copying process includes any block of the picture assigned to a different tile than a tile in which the current block resides.

Clause 20. The device of clause 18, wherein the one or more processors are further configured to, when determining the one or more syntax elements, determine, in one or more of a picture parameter set or sequence parameter set, an intrabc_across_tiles_enabled_flag syntax element indicating whether a region that was determined during application of the intra block copying process includes any block of the picture assigned to a different tile than a tile in which the current block resides.

Clause 21. The device of clause 18, wherein the one or more processors are further configured to, when determining the one or more syntax elements, determine an intrabc_cross_slices_enabled_flag syntax element indicating whether a region that was determined during application of the intra block copying process includes any block of the picture assigned to a different slice than a slice in which the current block resides.

Clause 22. The device of clause 18, wherein the one or more processors are further configured to, when determining the one or more syntax elements, determine, in one or more of a picture parameter set or sequence parameter set, an intrabc_cross_slices_enabled_flag syntax element indicating whether a region that was determined during application of the intra block copying process includes any block of the picture assigned to a different slice than a slice in which the current block resides.

Clause 23. A device comprising:
means for determining one or more syntax elements describing application of an intra block copying process to a current block of a picture to generate an encoded version of the current block of the picture; and
means for decoding the encoded version of the current block of the picture based on the one or more syntax elements.

Clause 24. The device of clause 23, wherein means for determining the one or more syntax elements comprises means for determining an intrabc_across_tiles_enabled_flag indicating whether a region that was determined during application of the intra block copying process includes any block of the picture assigned to a different tile than a tile in which the current block resides.

Clause 25. The device of clause 23, wherein the means for determining the one or more syntax elements comprises means for determining, in one or more of a picture parameter set or sequence parameter set, an intrabc_across_tiles_enabled_flag syntax element indicating whether a region that was determined during application of the intra block copying process includes any block of the picture assigned to a different tile than a tile in which the current block resides.

Clause 26. The device of clause 23, wherein the means for determining the one or more syntax elements comprises means for determining an intrabc_cross_slices_enabled_flag syntax element indicating whether a region that was determined during application of the intra block copying process includes any block of the picture assigned to a different slice than a slice in which the current block resides.

Clause 27. The device of clause 23, wherein the means for determining the one or more syntax elements comprises means for determining, in one or more of a picture parameter set or sequence parameter set, an intrabc_cross_slices_enabled_flag syntax element indicating whether a region that was determined during application of the intra block copying process includes any block of the picture assigned to a different slice than a slice in which the current block resides.

Clause 28. A non-transitory computer-readable storage medium having stored thereon instructions that, when executed, cause one or more processors to:
determine one or more syntax elements describing application of an intra block copying process to a current block of a picture to generate an encoded version of the current block of the picture; and
decode the encoded version of the current block of the picture based on the one or more syntax elements.

Clause 29. A method comprising coding video data in accordance with a restriction in which a prediction block for a block of video data is not permitted to overlap a current coding unit.

Clause 30. A method comprising coding video data comprising coding a block of a current coding unit of video data using a prediction block for the block, wherein the prediction block is located at least partially within an already coded block of the current CU.

Clause 31. The method of clause 30, wherein the prediction block is located completely within the current CU.

Clause 32. The method of any of clauses 29-31, further comprising reconstructing a first portion of the prediction block without reconstructing a second portion of the prediction block, wherein the first portion is different than the second portion.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data comprising:
   performing, by one or more processors, an intra block copying process to decode a coded current block of a picture, wherein the coded current block comprises one of a coded current prediction unit (PU) or a coded current transform unit (TU) of a coded current coding unit (CU),
   wherein performing the intra block copying process comprises:
      obtaining an offset vector that identifies the prediction block restricted to be within a same slice or a same tile as that in which the coded current block resides, wherein the same slice comprises one of a plurality of slices, or the same tile comprises one of a plurality of tiles, the picture divided into the plurality of slices or the plurality of tiles, the coded current CU is in a coding tree unit (CTU) of the picture, and wherein the same slice or the same tile only includes the CTU in which the coded current CU resides and not a CTU to the left of the CTU in which the coded current CU resides;
      obtaining the prediction block from within the same slice or the same tile in which the coded current block resides based on a location of the coded current block and the offset vector, wherein the prediction block does not overlap the coded current CU; and
      decoding the coded current block based on the prediction block.

2. The method of claim 1, wherein the prediction block has not been processed using any in-loop filtering.

3. The method of claim 1, wherein a size of the offset vector has been restricted such that the offset vector is unable to identify a block outside of the same slice or the same tile in which the coded current block resides.

4. The method of claim 1, wherein performing the intra block copying process comprises:
   obtaining an offset vector that identifies the prediction block that resides partially within the same slice or the same tile as that in which the coded current block resides;
   padding the slice or the tile to generate a padded slice or a padded tile that fills in a portion of the prediction block that resides outside of the slice or the tile;
   obtaining the prediction block based on a location of the coded current block and the offset vector, the prediction block including at least some portion of the padding; and
   decoding the coded current block based on the prediction block.

5. The method of claim 1, further comprising obtaining, in one or more of a picture parameter set or sequence parameter set included within a bitstream to which the coded current block is stored, an intrabc_across_tiles_enabled_flag syntax element indicating whether a region used when performing the intra block copying process during encoding of the coded current block was determined such that the region does not include any block assigned to a different tile than the tile in which the coded current block resides, and
   wherein performing the intra block coding process comprises performing the intra block coding process based on the intrabc_across_tiles_enabled_flag syntax element.

6. The method of claim 1, further comprising obtaining, in one or more of a picture parameter set or sequence parameter set included within a bitstream to which the coded current block is stored, an intrabc_across_slices_enabled_flag syntax element indicating whether a region used when performing the intra block copying process during encoding of the coded current block was determined such that the region does not include any block assigned to a different slice than the slice in which the coded current block resides, and
   wherein performing the intra block coding process comprises performing the intra block coding process based on the intrabc_across_slices_enabled_flag syntax element.

7. The method of claim 1, wherein the prediction block is inter predicted from a reference block in a different slice or tile.

8. The method of claim 1, wherein the coded current CU is in a coding tree unit (CTU) of the picture, and wherein the search region only includes a CTU to the left of the CTU of the coded current CU and the CTU of the coded current CU.

9. A method of encoding video data comprising:
   dividing, by one or more processors, a picture into a plurality of slices or a plurality of tiles;
   performing, by the one or more processors, an intra block copying process to code a current block of the picture, wherein the current block comprises one of a current prediction unit (PU) or a current transform unit (TU) of a current coding unit (CU), the intra block copying process comprising:
      identifying a search region in a video picture for the current block that does not include pixels from a different one of the plurality of slices or from a different one of the plurality of tiles in which the current block resides, the current CU is in a coding tree unit (CTU) of the picture, and the search region only includes the CTU in which the coded current CU resides and not a CTU to the left of the CTU in which the coded current CU resides;
      after identifying the search region, accessing each block within the search region, determining a difference between each block accessed within the search region and the current block, and selecting a prediction block from each of the blocks accessed within the search region that resulted in a smallest difference between the accessed blocks and the current block;
      encoding the current block based on the prediction block selected from the search region comprising identify a prediction block that resides at least partially within the determined search region and that does not overlap the current CU, and encoding the current block based on the identified prediction block.

10. The method of claim 9, wherein pixels included in the search region have not been processed using any in-loop filters.

11. The method of claim 9, wherein the current block comprises one of a current prediction unit (PU) or a current transform unit (TU) of a current coding unit (CU).

12. The method of claim 9, wherein performing the intra block copying process comprises:
   restricting a size of an offset vector identifying a location of a prediction block relative to the current block within the search region such that the offset vector is unable to identify those blocks of the search region that reside outside of the slice or the tile in which the current block resides;
   identifying a prediction block within the search region based on the offset vector; and
   encoding the current block based on the identified prediction block.

13. The method of claim 9, wherein performing the intra block copying process comprises:
   determining a region that extends beyond the slice or the tile in which the current block resides, padding the slice or the tile to generate a padded slice or a padded tile that is the same size as the determined region;
   identifying a prediction block within the determined region; and
   encoding the current block based on the identified prediction block.

14. The method of claim 9, further comprising specifying, in one or more of a picture parameter set or sequence parameter set included within a bitstream to which the coded current block is stored, an intrabc_across_tiles_enabled_flag syntax element indicating whether the search region was determined such that the search region does not include any block of the picture assigned to the different tile than the tile in which the current block resides.

15. The method of claim 9, further comprising specifying, in one or more of a picture parameter set or sequence parameter set included within a bitstream to which the coded current block is stored, an intrabc_across_slices_enabled_flag syntax element indicating whether the search region was determined such that the search region does not include any block of the picture assigned to the different slice than the slice in which the current block resides.

16. The method of claim 9, wherein performing the intra block copying process comprises determining a region of the picture such that the region does not include any block of the picture assigned to the different slice or the different tile than the slice or the in which the current block resides and does not require pixel padding to be performed with respect to the picture.

17. A video decoding device comprising:
   a memory configured to store a current block of a picture, wherein the current block comprises one of a coded current prediction unit (PU) or a coded current transform unit (TU) of a coded current coding unit (CU), and
   one or more processors configured to perform an intra block copying process to decode the current block, the intra block copying process comprising:
      obtaining an offset vector that identifies the prediction block restricted to be within a same slice or a same tile as that in which the coded current block resides, wherein the same slice comprises one of a plurality of slices, or the same tile comprises one of a plurality of tiles, the picture divided into the plurality of slices or the plurality of tiles, the coded current CU is in a coding tree unit (CTU) of the picture, and wherein the same slice or the same tile only includes the CTU in which the coded current CU resides and not a CTU to the left of the CTU in which the coded current CU resides;
      obtaining the prediction block from with the same slice or the same tile in which the coded current block resides based on a location of the coded current block and the offset vector, wherein the prediction block does not overlap the coded current CU; and
      decoding the coded current block based on the prediction block.

18. The video decoding device of claim 17, wherein the prediction block has not been processed using any in-loop filtering.

19. The video decoding device of claim 17, wherein a size of the offset vector has been restricted such that the offset vector is unable to identify a block outside of the same slice or the same tile in which the coded current block resides.

20. The video decoding device of claim 17, wherein the one or more processors are configured to obtain an offset vector that identifies the prediction block that resides partially within the same slice or the same tile as that in which the coded current block resides, pad the slice or the tile to generate a padded slice or a padded tile that fills in a portion of the prediction block that resides outside of the slice or the tile, obtain the prediction block based on a location of the coded current block and the offset vector, the prediction block including at least some portion of the padding, and decode the coded current block based on the prediction block.

21. The video decoding device of claim 17, wherein the one or more processors are further configured to obtain, in one or more of a picture parameter set or sequence parameter set included within a bitstream to which the coded current block is stored, an intrabc_across_tiles_enabled_flag syntax element indicating whether the search region used when performing the intra block copying process during encoding of the coded current block was determined such that the search region does not include any block assigned to a different tile than the tile in which the coded current block resides, and
   wherein the one or more processors are configured to perform the intra block coding process based on the intrabc_across_tiles_enabled_flag syntax element.

22. The video decoding device of claim 17, wherein the one or more processors are further configured to obtain, in one or more of a picture parameter set or sequence parameter set included within a bitstream to which the coded current block is stored, an intrabc_across_slices_enabled_flag syntax element indicating whether the search region used when performing the intra block copying process during encoding of the coded current block was determined such that the search region does not include any block assigned to a different slice than the slice in which the coded current block resides, and
   wherein the one or more processors are configured to perform the intra block coding process based on the intrabc_across_slices_enabled_flag syntax element.

23. A video encoding device comprising:
   a memory configured to store a current block of a picture, wherein the current block comprises one of a current prediction unit (PU) or a current transform unit (TU) of a current coding unit (CU); and one or more processors configured to:

divide the picture into a plurality of slices or a plurality of tiles;

perform an intra block copying process to encode the current block, the intra block copying process comprising:

identifying a search region in a video picture for the current block that does not include pixels from a different one of the plurality of slices or from a different one of the plurality of tiles in which the current block resides, the current CU is in a coding tree unit (CTU) of the picture, and the search region only includes the CTU in which the coded current CU resides and not a CTU to the left of the CTU in which the coded current CU resides;

after identifying the search region, accessing each block within the search region, determining a difference between each block accessed within the search region and the current block, and selecting a prediction block from each of the blocks accessed within the search region that resulted in a smallest difference between the accessed blocks and the current block; and encoding the current block based on the prediction block selected from the search region comprising identify a prediction block that resides at least partially within the determined search region and that does not overlap the current CU, and encoding the current block based on the identified prediction block.

24. The video encoding device of claim 23, wherein pixels included in the search region have not been processed using any in-loop filters.

* * * * *